F. SIMPSON.
REMOVABLE BOTTLE VALVE.
APPLICATION FILED DEC. 27, 1913.
1,181,804.
Patented May 2, 1916.
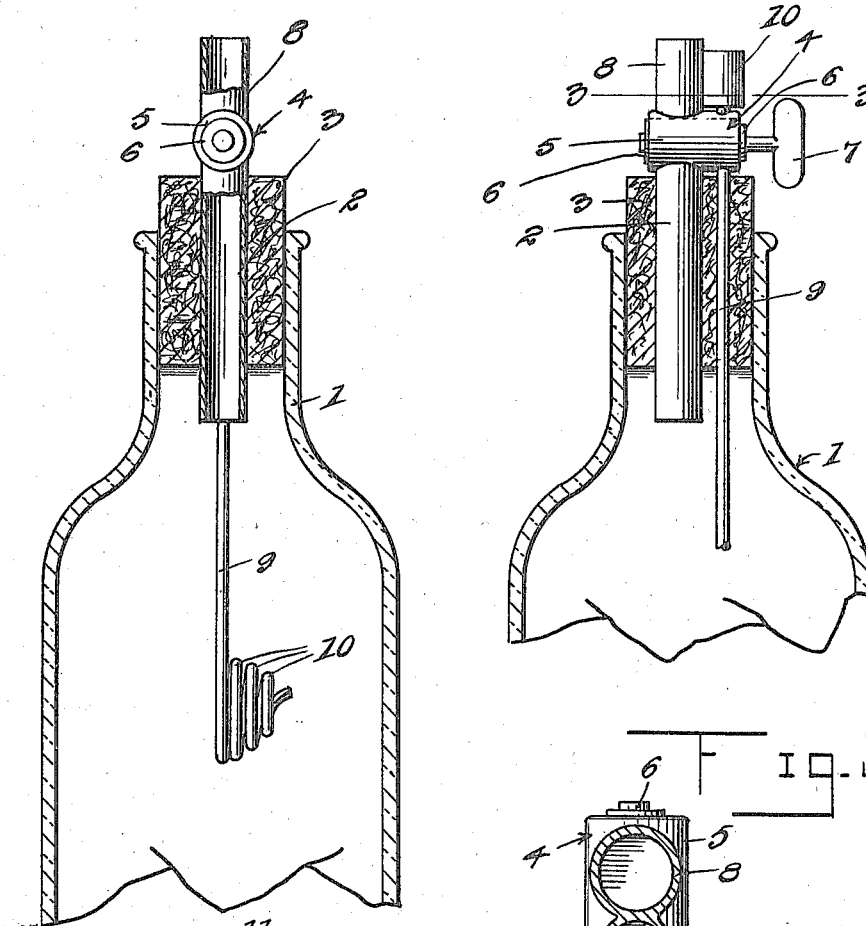

UNITED STATES PATENT OFFICE.

FRANK SIMPSON, OF LA JOLLA, CALIFORNIA.

REMOVABLE BOTTLE-VALVE.

1,181,804.     Specification of Letters Patent.     Patented May 2, 1916.

Application filed December 27, 1913. Serial No. 809,065.

*To all whom it may concern:*

Be it known that I, FRANK SIMPSON, a citizen of the United States, residing at La Jolla, in the county of San Diego and State of California, have invented certain new and useful Improvements in Removable Bottle-Valves; and I do hereby declare the following to be a full, clear, and exact description of the invention, such as will enable others skilled in the art to which it appertains to make and use the same.

My invention relates to improvements in bottle valves more particularly to a valve arranged to close the mouth of a bottle, jug or like receptacle that will permit the regulation of the flow of liquid from the receptacle and to prevent splashing and the gurgling incident to the emptying of the receptacle.

An important object of the invention is to provide a device such as above described that is removably fitted within the neck of a bottle or like receptacle and arranged to close the bottle neck and to permit a full even flow of the liquid incident to the emptying of the bottle, the amount of which may be regulated as desired this being particularly desirable in measuring doses of medicine to prevent the waste thereof in pouring the medicine into a spoon or small glass.

Another object of importance is to provide a device such as above described which will permit the entrance of air to the receptacle to provide a ready flow of the contents thereof through a discharge tube forming a part of the invention, said air being filtered through a chamber having a filtering medium therein and connected with an air intake tube so that contamination of the contents of the bottle is prevented.

The invention further aims to improve devices of the above mentioned character so as to render them more practical, durable, cheap to manufacture and more commercially desirable.

The above and additional objects are accomplished by such means as are illustrated in the accompanying drawings, described in the following specification and then more particularly pointed out in the claim which is appended hereto and forms a part of this application.

With reference to the drawings, wherein I have illustrated the preferred embodiment of my invention as it is reduced to practice, and throughout the several views of which, similar reference numerals designate corresponding parts: Figure 1 is a vertical sectional view taken through a bottle and the bottle valve of my improved construction, Fig. 2 is a sectional view through a bottle showing the valve in side elevation and mounted within the neck of a bottle, Fig. 3 is a transverse sectional view taken on line 3—3 of Fig. 2 showing the discharge tube and filtering chamber formed upon the upper end thereof, and Fig. 4 is a vertical sectional view taken through the filtering chamber and showing a portion of the air inlet tube attached thereto.

Referring to the drawings forming a part of this specification and in which like numerals are employed to designate corresponding parts, the numeral 1 designates as an entirety a bottle having the usual restricted and elongated neck.

The bottle valve of my improved construction is adapted to be mounted within the neck of the bottle 1 and consists of a cylindrical tube 2 upon which is mounted a suitable closure collar 3 formed of cork, rubber or some other suitable material. This closure collar 3 is adapted to fit closely within the neck of the bottle and to serve as a closure therefor. The cylindrical tube 2 is mounted so that its ends extend beyond the ends of the closure collar 3. Mounted upon the upper end of the cylindrical tube 2 is a valve designated 4 as an entirety of the turn plug type that is provided with the usual cylindrical casing 5, turn plug 6 and handle portion 7. A short section of cylindrical tube 8 is connected with the valve 4 in any suitable manner upon the upper side thereof so that the valve is interposed between the ends of the tubes 2 and 8 whereby the valve opening in the valve 6 is adapted to register with the opening in the tubes 2 and 8 to permit the discharge of the contents of the bottle or like receptacle. The valve casing 5 is provided with openings in the opposed sides thereof and the sections of the tubes are secured within and extend upwardly and downwardly from the casing. The tube 2 is mounted to one side of the center of the closure collar 3 and the valve 4 as well, for a purpose which will be later more fully described.

Mounted longitudinally of the closure collar 3 and extending therethrough is a small cylindrical tube or pipe 9 that is connected at its upper terminal at a point slightly spaced from the upper face of the closure collar 3 with the valve casing 5 and at its other terminal extends for a considerable distance within the body of the bottle and terminates in a plurality of vertically disposed coils 10 which act to prevent water getting into the tube 9 to prevent the inlet of the air therethrough. This tube 9 later referred to as the air inlet tube, is extended downwardly below the inner end of the tube 2 to permit the water to flow more readily through the tube 2 and prevent the liquid from gaining entrance to the tube 9.

Formed integral with the tube 8 upon one side thereof and at a point intermediate the ends thereof is a cylindrical pocket 10 having a small opening 11 at its upper end adjacent one side thereof and a central opening 11' in the bottom thereof that is provided with a downwardly extending annular flange 12. The opening 11 and flange 12 are adapted to receive the upper or outer end of a small section of piping 13 similar in size to the tube or pipe 9 and that is connected at its inner or lower terminal with the valve casing 5 in opposed relation to the connection of the tube 9 with the casing 5.

It will thus be seen that the valve or turn plug 6 is provided with spaced parallel ports adapted for registration respectively with the ends of the tubes 2 and 8 and pipes 13 and 9 to permit the respective air intake and liquid discharge from the tubes and pipes. The opening 11 in the cylindrical pocket 10 is adapted to permit the placing of a suitable quantity of filtering medium 14 within the pocket. The filtering medium 14 may be of any suitable kind such as medicated cotton, gauze or the like. It is preferable to have the filtering medium medicated so that the air admitted to the receptacle is purified thus preventing contamination of the liquid contents of the receptacle. By disposing the tube 2 to one side of the center of the closure collar 3 and connecting it to one side of the center of the closure collar 3 and connecting it to one side of the center of the valve 4 the proper positioning of the air inlet pipe 9 and connection thereof with the valve 4 is provided as will be clearly seen by reference to Fig. 2 in the drawings thus providing a compact structure.

In operation, assuming that the closure collar 3 with the tube 2 and pipe 9 and cooperating parts mounted therein is mounted within the neck of a bottle, the valve is turned to permit the entrance of air through the opening 11 in the pocket 10 and subsequently into the bottle 1 through the pipe or tube 9 and to permit the discharge of the contents of the bottle through the tubes 2 and 8. The bottle or receptacle is then tilted so that the contents thereof will readily flow through the tubes 2 and 8 and the air being admitted as above described provides for the ready flow of the liquid from the bottle and being filtered, contamination of the contents of the bottle is prevented.

It is desirable to emphasize the fact that the prevention of contamination is most desirable in rooms where persons are afflicted with contagious disease and it will be readily seen that a medicine receptacle provided with a device such as hereinbefore described will permit the ready discharging of the contents of the bottle and prevent contamination thereof by filtering the air admitted to the bottle as hereinbefore described.

The coils 10 at the inner terminal of the pipe 9 prevent the liquid gaining access to the pipe 9 to any great extent and interfering with the inlet of air to the bottle.

The filtering chamber 10 in being formed integral with the upper end of the tube 8 and connected with the upper end of the tube 9 forms a rigid and compact valve structure that is not liable to derangement.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus described my invention, what is claimed is:—

A removable bottle valve including a stopper adapted to be arranged in the neck of a bottle or analogous receptacles, a valve casing extending horizontally across the outer end of the stopper, a discharge tube passing through the stopper and communicating at its outer end with the valve casing, an air inlet tube also passing through the stopper and communicating with the valve casing at a point spaced from the discharge tube, said air inlet tube being extended beyond the inner ends of the discharge tube and having a terminal laterally disposed coil located within the projection of the stopper's periphery so as to be removed with the same, a nozzle section located above and communicating with the valve casing at a point diametrically opposite the discharge tube, a vertical filter casing mounted upon the valve casing and communicating with the same at a point spaced from the nozzle section, said filter casing being adapted to contain a sterilizing medium and having an air inlet aperture, and a valve plug operating in the valve casing and having spaced ports for controlling the passage of liquid through the discharge tube and the nozzle section and the passage of air through the air inlet tube and the filter casing.

In testimony whereof I affix my signature in presence of two witnesses.

FRANK SIMPSON.

Witnesses:
G. P. PECK,
JOS. J. KEITH.